United States Patent [19]

Sisk

[11] Patent Number: 5,067,856
[45] Date of Patent: Nov. 26, 1991

[54] IN-LINE AIR FILTER FOR DRY BULK TANK TRAILERS

[76] Inventor: David E. Sisk, R.R. 1, Box 340, Bonne Terre, Mo. 63628

[21] Appl. No.: 535,572

[22] Filed: Jun. 11, 1990

[51] Int. Cl.$^5$ .............................................. B60P 1/60
[52] U.S. Cl. ..................................... 406/41; 55/274; 55/356
[58] Field of Search ............... 210/435, 445, 446, 448, 210/450, 453, 497.3; 55/356, 503, 507, 509, 431, 274; 406/39, 89, 41

[56] References Cited

U.S. PATENT DOCUMENTS

| | | | |
|---|---|---|---|
| 1,132,194 | 3/1915 | Leao | 55/274 |
| 1,278,004 | 9/1918 | Pedigo | 210/445 |
| 1,458,464 | 6/1923 | Byers | 210/445 |
| 1,476,138 | 12/1923 | Bingay | 55/503 |
| 2,068,858 | 1/1937 | Jones | 55/502 |
| 3,424,501 | 1/1969 | Young | 55/431 |
| 3,488,928 | 1/1970 | Tarala | 55/274 |
| 4,367,081 | 1/1983 | Harvey | 55/503 |
| 4,909,814 | 3/1990 | Sisk | 55/431 |

FOREIGN PATENT DOCUMENTS 59212 5/1977 Japan ..................................... 55/521

Primary Examiner—Bernard Nozick
Attorney, Agent, or Firm—Paul M. Denk

[57] ABSTRACT

A filter assembly (10) for use with a dry bulk type trailer (B) for transporting granular material and other commodities. The trailer is pulled by a truck (T) having an air pump (P) installed thereon. The trailer has an air line (A) by which air is directed from an outlet (OL) of the pump to outlets (O1–O4) of compartments (C1–C4) of the trailer in which commodities are stored. A filter element (24) of the assembly is capable of removing dirt, dust, and rust particles entrained in the airstream flowing from the pump through the air line. The filter element is removably installed in a housing which is installable in-line withing in the airline. Couplers at each end of the housing effect connection of the housing in the air line. A pressure gauge (56) measures the pressure drop across the filter element to help determine when the element is becoming clogged and should be cleaned.

6 Claims, 2 Drawing Sheets

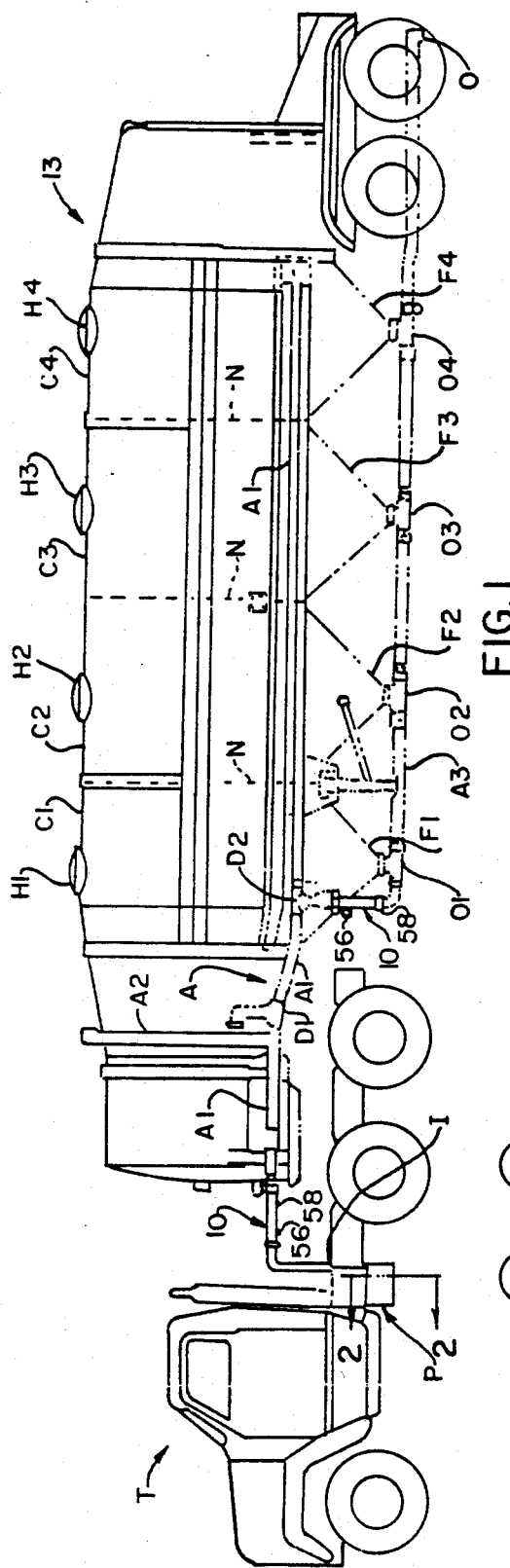
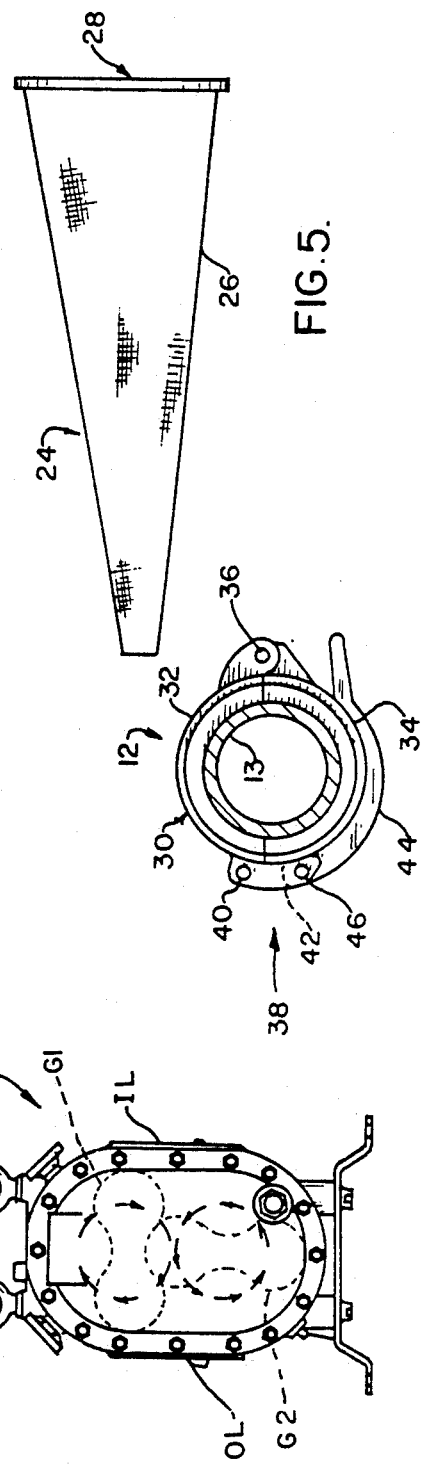
FIG.1.
FIG.5.
FIG.6.
FIG.2.

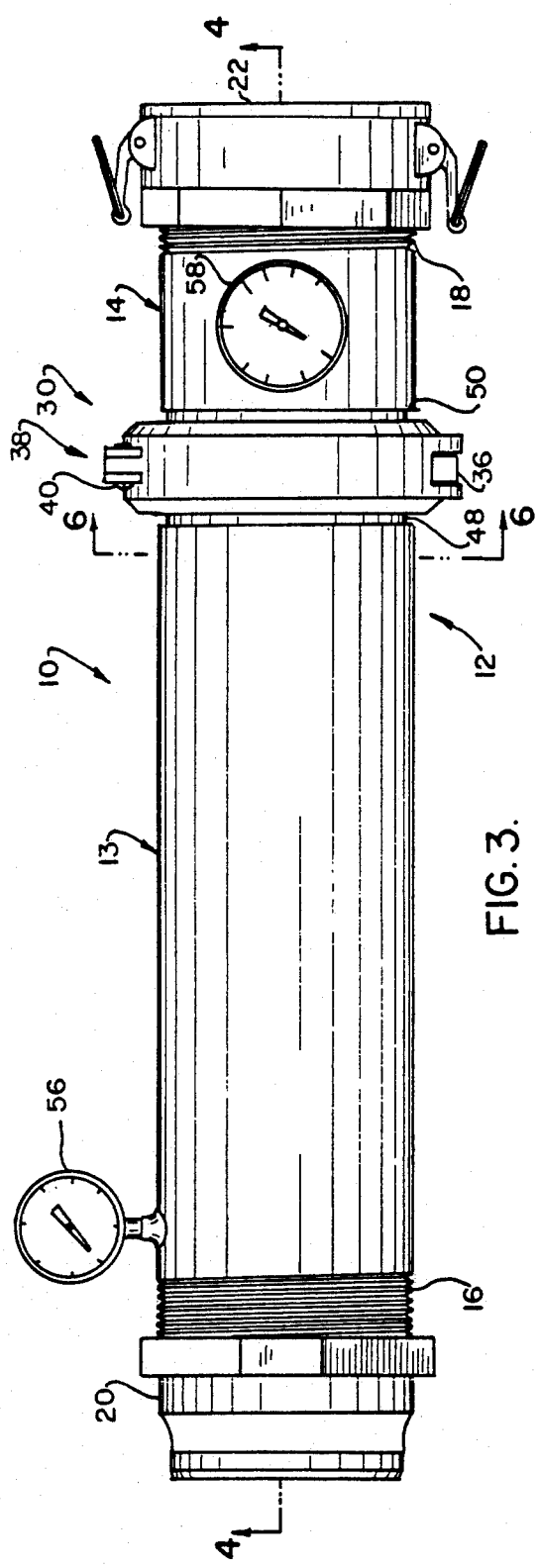
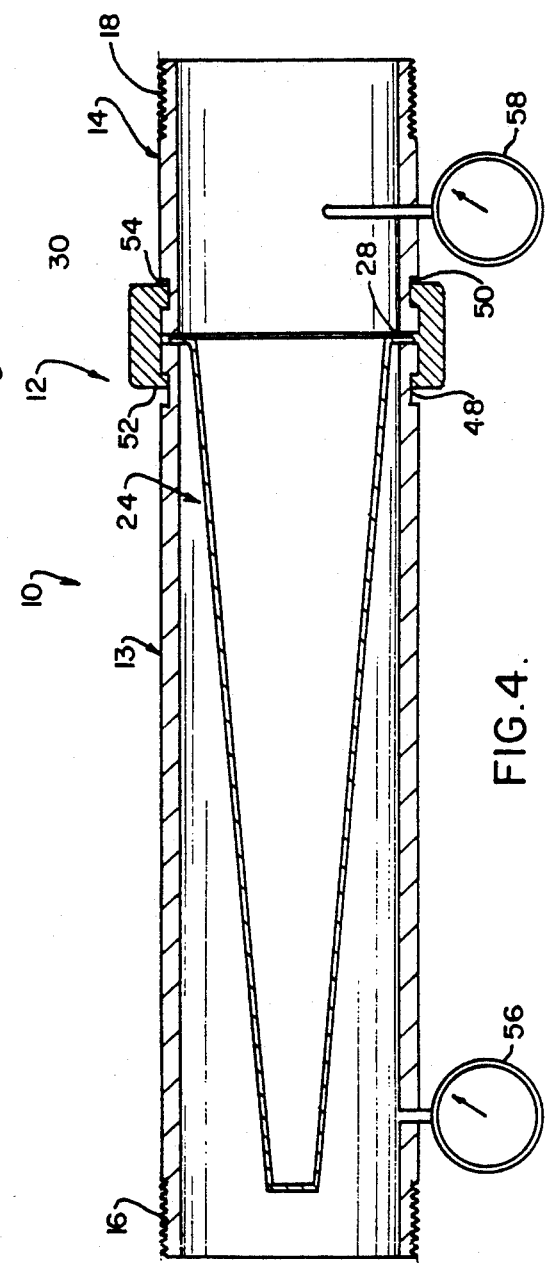
FIG. 3.
FIG. 4.

IN-LINE AIR FILTER FOR DRY BULK TANK TRAILERS

BACKGROUND OF THE INVENTION

This invention relates to air filters, and more particularly, to an in-line air filter for use with dry bulk tank trailers.

Over-the-road trailers are used to haul dry, bulk commodities. Typically, the truck to which such a trailer is hitched has a vacuum pump. An air line is attached to an outlet of the pump and is routed to the outlet section of various compartments (hoppers) within the trailer in which commodities are stored. These outlet sections usually include a manifold to which the air line is attached. The vacuum pump is used to generate an air flow by which vacuum pressure is produced at the outlets to create a suction through which force the commodity stored therein is drawn from the hoppers, entrained in the airstream, and directed to a storage location. It is possible for dirt and dust particles, and pieces of rust or other deleterious materials which have flaked off the internal parts of the pump, to be entrained in the airstream. These particles, if allowed to remain in the airstream, can contaminate the lading and either greatly reduce its value or render it worthless. To prevent this, filter assemblies are used in the air line to remove the dust, dirt and rust particles. These assemblies are installed in-line between the pump and the trailer.

Heretofore, the filters used have been paper element type filters. These exhibit a number or problems. First, they tend to disintegrate at air temperatures of between 300-350 degrees F. which can readily occur on a 100 degree F. ambient temperature day. Thus, the filter may fail completely, or not work as effectively as it should. In either event, the contamination problem noted above can occur. Secondly, the filters are not made to filter out smaller particles (40 microns or less), and therefore there is a great likelihood that minute dust, dirt, and rust particles will contaminate the lading. Third, the filters are not effective in reducing back pressure on the pump. Fourth, the filters are physically large in size and so are not easy to store. Lastly, the paper filters need frequent replacement which is time consuming and therefore costly both as to the filters required and the down-time needed to replace them.

SUMMARY OF THE INVENTION

Among the several objects of the present invention may be noted the provision of an improved air filter assembly for use with over-the-road type dry bulk tank trailers; the provision of such an improved filter assembly to remove dirt, dust and rust particles entrained in a stream of air produced by an pump and directed into an air line of the trailer; the provision of such an improved filter assembly to efficiently and effectively remove these particles, even those as small as 30-40 microns or less, so the particles cannot contaminate lading transported in the trailer while it is being unloaded; the provision of such an improved filter assembly to withstand high air temperatures without being effected thereby and without suffering a degradation in performace; the provision of such improved filter assembly which reduces back-pressure on the pump; the provision of such an improved filter assebly which is readily removed for cleaning between loads so as not to become clogged and thus functions properly at all times; the provision of such an improved filter assembly having a filter element which is long lived and does not therefore require frequent replacement; and, the provision of such an improved filter assembly which is easily installed at a number of different and convenient locations in an air line of the trailer.

In accordance with the invention, generally stated, a filter assembly having application for use with a dry bulk type trailer which tansports commodities. The trailer is pulled by a truck having an air pump installed thereon, and the trailer has an air line by which air is directed from an outlet of the pump to outlets of compartments (hoppers) within the trailer in which the commodities are stored. The air is used to help unload the commodity from the compartments. The filter assembly comprises a filter element capable of removing dirt, dust, and rust particles entrained in the air stream flowing from the pump through the air line. The element is removably installed in a housing and the housing is installed in-line in the air line between the pump and the outlets. The housing has a coupler at each end for connecting the housing in the air line. A gauge is provided for measuring the pressure drop across the filter element to help determine when the element is becoming clogged and should be cleaned. Other objects and features will be in part apparent and in part pointed out hereinafter.

BRIEF DESCRIPTION OF THE DRAWINGS

FIG. 1 is a side elevational view of an over-the-road dry bulk tank trailer illustrating various in-line connection points for an air filter assembly of the present invention;

FIG. 2 is a sectional view, taken along line 2—2 of FIG. 1, of a conventional pressure vacuum pump used to pump air through an air line of the trailer;

FIG. 3 is a side eleveational view of an in-line filter assembly of the present invention;

FIG. 4 is sectional view of the assembly taken along line 4—4 of FIG. 3;

FIG. 5 is a side view of the filter element used in the assembly; and

FIG. 6 is a sectional view taken along line 6—6 in FIG. 3.

Corresponding reference characters indicate corresponding parts throughout the drawings.

DESCRIPTION OF THE PREFERRED EMBODIMENT

Referring to the drawings, an over-the-road, dry bulk type trailer for transporting commodities is indicated generally at B in FIG. 1. The trailer is divided, by internal partitions N, into a number of compartments or hoppers C, four such hoppers, C1-C4, being indicated in FIG. 1. Hatches H1-H4 for loading commodity into each respective compartment is installed in the roof of the the trailer above each compartment. The lower end of each hopper tapers downwardly and inwardly to form funnel shaped outlet sections, F1-F4, respectively, for the hoppr. An outlet assembly O1-O4, respectively, for each hopper is located beneath the trailer and is connected to the lower outlet end of each outlet section. During unloading of the trailer, commodity flows into these assemblies and is carried off to a storage container (not shown). An air line A is located on the outside of the trailer and extends its length. The air line has an inlet end I at the front of the trailer. This end fits over the top of the trailer and mounts on a post (not shown) on the opposite side of the trailer when the air line is not in use. The forward section of the air line extends horizontally of the trailer to a fitting or tee D1. The air line then branches off into lines A1 and A2. Line A1 continues horizontally of the hopper car; while line A2 rises vertically and connects to a fitting (not shown) in the top of the trailer. Line A1 continues horizontally to a second fitting or tee D2. Again, the air line branches. Line A1 continues horizontally of the car to the rear end thereof. This line is connected to fittings in the side of the trailer and air flowing through this section is used to aerate the lading being transported in the trailer. A third section A3 now extends downwardly and then rearwardly. This line connects with a manifold of each of the outlet assemblies.

The trailer is connected, in the conventional manner, to a truck T. The truck includes a vacuum pump P located behind its cab. As shown in FIG. 2, pump P is a conventional type gear pump having an inlet IL and an outlet OL. The pumping section of the pump includes a pair of dual lobe intermeshing gears G1 and G2. Inlet I of the air line is connected to the outlet of pump P. For unloading trailer B, pump P is activated. Air flow through section A3 of the airline, produced by pump P, creates a vacuum, or low air pressure condition, at each outlet. This creates a suction at the outlets which draws or pulls commodity out of the respective hoppers. The commodity is entrained in the airstream flowing through the line. The other end of the section A3 of the airline is connected to a hose (not shown) by which the commodity is delivered to a storage site.

During operation of pump P, dirt and dust particles and the like are pulled through the pump and entrained with the air blown through the air line. In addition, rust particles from the inside of the pump may also flake off and be entrained with the airstream. These particles can contaminate the commodity or lading being off-loaded. For some commodities, any contamination can greatly lower its value or usefulness. To prevent this, it has been the practice to install an in-line filter in the air line to filter out these potential contaminants. These filters have been paper filters. It is known that such filters have certain deficiencies, including their inability to withstand higher temperatures, to need frequent replacement, and to only filter out particles above a certain size.

Referring to FIGS. 3 and 4, an air filter assembly of the present invention is indicated generally at 10. The assembly includes a housing 12 which is formed of two sections 13 and 14. Both sections are internally hollow, and cylindrical sections with section 13 being substantially longer than section 14. The inner and outer diameters of each section are the same. The forward end 16 of section 13 is threaded, as is the rear end 18 of section 14. Respective couplers 20 and 22 are threadably received on these sections. Coupler 20 is a female fitting by which one end of the filter assembly can be installed in-line in airline A. Coupler 22 is a male, cam-lock fitting by which the other end of the assembly can be installed in-line. It will be understood that other different couplers can be installed on the respective ends of the assembly to facilitate installation of the filter assembly in the airline.

Referring again to FIG. 1, the filter assembly can be installed in-line in airline A in a number of locations. Thus, for example, the assembly can be installed in section A1 of the airline between pump P fitting D1. In this installation, all the air flowing through the airline will be filtered. Alternately, the filter assembly is installed in airline section A3 on the downstream side of fitting D2 so only air directed at the outlet assemblies will be filtered. Or, perhaps the filter may be installed at multiple locations.

The filter assembly next includes a cleanable air filter element 24 capable of removing dirt, dust, and rust particles entrained in the air stream flowing from the pump through the air line. Filter element 24, which is of a frusto-conical shape, is removably installable in the housing. The filter assembly is of a wire mesh material 26 and is capable of removing particles at least as 30–40 microns in size, and in some instances, as small as 10 microns in diameter. As shown in FIG. 4, the filter element has an elongated taper when viewed in section, the length of the filter element extending almost the entire length of housing section 13. The larger diameter end of the filter assembly has a circumferential flange 28 formed thereabout. This larger diameter end of the element is open, while the opposite, smaller diameter end is closed by the wire mesh material. The outer diameter of flange 28 corresponds to the outer diameter of housing sections 13 and 14 for the filter element to be insertable in housing section 13 with the flange being sandwiched between the mating ends of the housing sections.

A circumferential clamp 30 fits over the outside of housing 12, at the juncture between the housing sections, to clamp the sections together. Clamp 30 has two curved sections 32 and 34 which are joined at one end by a pin 36. A locking mechanism 38 is pivotally connected to the other end of section 32 by a pin 40. The other end of sectgon 34 has an outward projection 42 over which mechanism 38 fits. A latching handle 44 is pivotally connected to the outer end of mechanism 38 by a pin 46. The handle has a camming surface which abuts projection 42 so to press sections 32 and 34 together when the handle is rotated counter-clockwise as shown in FIG. 6. As can be seen in FIG. 4, each housing section 13 and 14 has a circumferential groove, 48 and 50 respectively. The height of clamp 30 is such that it extends between these grooves when installed on the filter assembly and sections 32, 34 of the clamp have inwardly extending rims 52, 54 which fit within the grooves to properly position the clamp.

The filter assembly is installed in the air line so during normal operation of the system, the blunt, smaller diameter and of the filter element faces into the airstream. thus, as shown in FIG. 4, the dust, dirt, or rust particles entrained with the airstream enter the filter assembly through end 16 of housing section 13. They then impact the end and sides of the filter assembly and are entrapped by the wire mesh filter material. Filtered air then exits the filter assembly through end 18 of housing section 14. After operation of the system is completed, the filter assembly can be removed from the airline. Now, end 18 of housing section 14 is connected to a blower, which can be the pump P, and air is blown backward through the filter assembly to dislodge particles trapped on the filter element. If desired, the filter element can be removed from the assembly, by releasing clamp 30 and separating the housing sections. The filter element can then be washed with water or other cleaning fluid and then reinstalled in the assembly. Since the element does not have to be replaced, the cost of maintaining the filter system is substantially reduced.

The filter assembly also includes an air pressure gauge 56, and an air temperature gauge 58. The air pressure gauge is installed upon housing section 13 and is used to monitor the pressure drop across the filter element. This, in turn, reflects the operating status of the element. If the air pressure reading gauge begins to read higher pressure levels, it is an indication that the filter element is becoming clogged and needs to be cleaned. The air temperature gauge is installed in housing section 14 and is used to measure the air temperature within the system. This can reach temperatures such a 375 degrees F. or higher, on 100 degree F. days. With paper filters of the type used in previous air filters, these levels could damage or destroy the filter element. However, these extreme conditions do not effect performance of filter element 24.

As a further optional usage and application of this invention, the in-line filter 10 of this invention, as can be seen in FIG. 1, may be positioned at two locations. One within line A1 and the other within line A3. At these positions, it will filter the air as the operator is pneumatically conveying flour, plastic, and other general commodities normally. But, if there is a pressure differential developed, such as sometimes can occur when the pressure in the customer's storage bin becomes greater than the pressure generated through the trailer, this reverse pressure differential can cause the granular product to attempt to flow backwards, through these air lines A3 and A1. On the other hand, with the positioning of the filters 10, as explained, when a large volume of the granular product hits and encounters the stainless steel elements of these inventive filters, it quickly closes their pores, and stops the product from backing up through their lines and associated valves. Hence, the filters act as a check valve within the system. Then, when the pressure differential changes, and the pressure gets greater in the pneumatic tank and trailer, and within the air lines A1 and A3, such regenerated pressure, at this stage which will be greater than the pressure within the customer's storage tank or bin, has a tendency to blow the granular product off of the stainless filter elements, allowing the air to flow once again, normally, through the filters, where it will be filtered under routine operating conditions of its dust and other deleterious particle ingredients.

Numerous variations, within the scope of the appended claims, will be apparent to those skilled in the art in light of the foregoing description of the accompanying drawings.

Having thus described the invention, what is claimed and desired to be secured by Letters Patent is:

1. A filter assembly for use with a dry bulk type tank trailer for transporting commodities, the trailer having an air line by which air from an air pump is directed to outlet assemblies of compartments within the trailer to which commodities are stored to unload the commodities, the filter assembly comprising:
   a cleanable air filter element capable of removing dirt, dust, and other deleterious particles entrained in the air stream flowing from the pump through the air line;
   a housing in which the filter element is removably installed, the housing being installable in-line in the air line;
   coupling means at each end of the housing for connecting the housing in the air line, the coupling means comprising a cam lock coupler on each end of the housing;
   the filter element is of a frusto-conical shape, wherein the larger diameter end of the filter assembly has a circumferential flange formed thereabout;
   the housing comprising two sections with the flange portion of the filter element being capturable between adjacent ends of the sections to install the element in the housing;
   clamping means fitting over the outside of the housing, at the juncture between the housing sections, to clamp the sections together, said filter element functioning as a check valve to prevent the reverse flow of air through the air line due to developed pressure differentials within the trailer and its site of unloading, whereby said filter assembly being removably installed in-line of the air line and for removing any dirt, dust and rust particles entrained within the air stream flowing through the air line while removing commodities from the various outlet assemblies of the trailer compartments during their unloading.

2. The filter assembly of claim 1 wherein the filter elemen is of a wire mesh material and is capable of removing particles at least as small as 30–40 microns in size.

3. The filter assembly of claim 1 and including gauge means for measuring the pressure drop across the filter element to help determine when the element is becoming clogged and should be cleaned, and said gauge means including a pressure gauge for sensing the pressure drop across the filter element.

4. The filter assembly of claim 3 wherein the gauge means further includes a temperature gauge for measuring the air temperature inside the housing.

5. The filter assembly of claim 4 wherein the temperature gauge is downstream in the housing from the filter element.

6. An unloading system for use within an over-the-road dry bulk type tank trailer for transporting commodities, the trailer of the tank trailer being divided into a plurality of compartments in which commodities are stored, each compartment having an outlet at the bottom thereof through which commodity is unloaded, and the system comprising:
   an air line routed over the trailer and connected to each of the compartment outlets for air to be directed across the outlets to create a suction by which commodity is drawn from each compartment to unload the commodity;
   an air pump to one end of which the air line is connected; and
   an air filter assembly removably installed in-line in the air line for removing dirt, dust, and other deleterious particles entrained in the air stream flowing from the pump through the air line, the filter having a cleanable air filter element, a housing in which the filter element is removably installed, coupling means at each end of the housing for connecting the filter assembly in the air line before its connection to a first compartment, and gauge means for measuring the pressure drop across the filter element to help determine when the element is becoming clogged and should be cleaned.

* * * * *

UNITED STATES PATENT AND TRADEMARK OFFICE
CERTIFICATE OF CORRECTION

PATENT NO. : 5,067,856
DATED : Nov. 26, 1991
INVENTOR(S) : David E. Sisk It is certified that error appears in the above-identified patent and that said Letters Patent is hereby corrected as shown below:

Claim 2, column 6, line 24, change "elemen" to ---element---.

Signed and Sealed this

Twenty-third Day of March, 1993

Attest:

STEPHEN G. KUNIN

*Attesting Officer*      Acting Commissioner of Patents and Trademarks